US009818304B2

(12) United States Patent
Modica et al.

(10) Patent No.: US 9,818,304 B2
(45) Date of Patent: Nov. 14, 2017

(54) METHOD AND APPARATUS FOR REPRESENTING AN AERIAL DELIVERY PATH

(71) Applicant: HERE Global B.V., Veldhoven (NL)

(72) Inventors: Leo Modica, Sawyer, MI (US); Leon Stenneth, Chicago, IL (US)

(73) Assignee: HERE GLOBAL B.V., Veldhoven (NL)

( * ) Notice: Subject to any disclaimer, the term of this patent is extended or adjusted under 35 U.S.C. 154(b) by 118 days.

(21) Appl. No.: 14/925,565

(22) Filed: Oct. 28, 2015

(65) Prior Publication Data
US 2017/0124883 A1    May 4, 2017

(51) Int. Cl.
*G08G 5/00*    (2006.01)
*G01S 17/02*    (2006.01)

(52) U.S. Cl.
CPC ............ *G08G 5/0034* (2013.01); *G01S 17/02* (2013.01); *G08G 5/0069* (2013.01)

(58) Field of Classification Search
CPC ..... G08G 5/0034; G08G 5/0069; G01S 17/02
See application file for complete search history.

(56) References Cited

U.S. PATENT DOCUMENTS

| 9,174,733 | B1* | 11/2015 | Burgess | B64D 1/12 |
| 9,174,738 | B1* | 11/2015 | Roach | B64D 1/12 |
| 9,321,531 | B1* | 4/2016 | Takayama | B64D 1/12 |
| 9,567,081 | B1* | 2/2017 | Beckman | B64D 1/12 |
| 2003/0112235 | A1 | 6/2003 | Grace | |
| 2014/0180914 | A1 | 6/2014 | Abhyanker | |
| 2014/0330456 | A1 | 11/2014 | Lopez Morales et al. | |

OTHER PUBLICATIONS

The Atlantic, "Inside Google's Secret Drone-Delivery Program", Aug. 28, 2014, retrieved on Dec. 2, 2015 from http://www.theatlantic.com/technology/archive/2014/08/inside-googles-secret-drone-delivery-program/379306/, 24 Pages.

(Continued)

*Primary Examiner* — Richard Camby
(74) *Attorney, Agent, or Firm* — Ditthavong & Steiner, P.C.

(57) ABSTRACT

An approach is provided for constructing a delivery path that enables a UAV to safely access a delivery surface and avoids restricted access surfaces from the open sky. The approach involves determining at least one delivery path to at least one delivery surface, wherein the delivery path represents at least one three-dimensional variable width path along which an aerial delivery vehicle can access the at least one delivery surface. The approach also involves transecting the delivery path with one or more planar surfaces. The approach further involves determining one or more shapes on the one or more planar surfaces, wherein the one or more shapes represent one or more intersections of the delivery path and the one or more planar surfaces. The approach also involves constructing at least one delivery path data object comprising at least one ordered list of the one or more shapes to represent the delivery path.

20 Claims, 13 Drawing Sheets

(56) References Cited

OTHER PUBLICATIONS

Bora, "Amazon Working on Drone-Based Delivery Service: Aerial Vehicles Known As 'Octocopters' Expected to Deliver Packages in 30 Minutes", International Business Times, Dec. 2, 2013, retrieved on Dec. 2, 2015 from http://www.ibtimes.com/amazon-working-drone-based-delivery-service-aerial-vehicles-known-octocopters-expected-deliver, 6 Pages.

Hern, "DHL launches first commercial drone 'parcelcopter' delivery service", Sep. 25, 2014, retrieved on Dec. 2, 2015 from http://www.theguardian.com/technology/2014/sep/25/german-dhl-launches-first-commercial- drone-delivery-service, 2 Pages.

Office Action for corresponding European Patent Application No. 16194642.1-1802, dated Mar. 2, 2017, 8 pages.

\* cited by examiner

METHOD AND APPARATUS FOR REPRESENTING AN AERIAL DELIVERY PATH

BACKGROUND

Service providers and developers are continually challenged to deliver value and convenience to consumers by, for example, providing compelling network services. One area of interest has been the delivery of goods via an unmanned aerial vehicle (UAV). However, UAVs often encounter significant technical challenges in detecting a delivery surface (e.g., a driveway, a walkway, a porch, a doorstep, etc.). In addition, UAVs often encounter significant technical challenges in detecting obstructions proximate to and/or in route to a delivery surface. Two-dimensional (2D) and three-dimensional (3D) data exists relative to various geographic delivery locations, delivery paths, and/or delivery surfaces that can assist a UAV to navigate the various technical challenges. However, extracting and encoding a safe delivery path for a UAV from this information is challenging. Accordingly, there is a need for constructing a delivery path that enables a UAV to safely deliver a package to a delivery location while avoiding obstacles.

SOME EXAMPLE EMBODIMENTS

Therefore, there is a need for an approach for constructing a delivery path that enables a UAV to safely access a delivery surface from the open sky.

According to one embodiment, a method comprises determining at least one delivery path to at least one delivery surface, wherein the at least one delivery path represents at least one three-dimensional variable width path along which at least one aerial delivery vehicle can access the at least one delivery surface. The method also comprises transecting the at least one delivery path with one or more planar surfaces. The method further comprises determining one or more shapes on the one or more planar surfaces, wherein the one or more shapes represent one or more intersections of the at least one delivery path and the one or more planar surfaces. The method also comprises constructing at least one delivery path data object comprising at least one ordered list of the one or more shapes to represent the at least one delivery path.

According to another embodiment, an apparatus comprises at least one processor, and at least one memory including computer program code for one or more computer programs, the at least one memory and the computer program code configured to, with the at least one processor, cause, at least in part, the apparatus to determine at least one delivery path to at least one delivery surface, wherein the at least one delivery path represents at least one three-dimensional variable width path along which at least one aerial delivery vehicle can access the at least one delivery surface. The apparatus is also caused to transect the at least one delivery path with one or more planar surfaces. The apparatus is further caused to determine one or more shapes on the one or more planar surfaces, wherein the one or more shapes represent one or more intersections of the at least one delivery path and the one or more planar surfaces. The apparatus is also caused to construct at least one delivery path data object comprising at least one ordered list of the one or more shapes to represent the at least one delivery path.

According to another embodiment, a computer-readable storage medium carries one or more sequences of one or more instructions which, when executed by one or more processors, cause, at least in part, an apparatus to determine at least one delivery path to at least one delivery surface, wherein the at least one delivery path represents at least one three-dimensional variable width path along which at least one aerial delivery vehicle can access the at least one delivery surface. The apparatus is also caused to transect the at least one delivery path with one or more planar surfaces. The apparatus is further caused to determine one or more shapes on the one or more planar surfaces, wherein the one or more shapes represent one or more intersections of the at least one delivery path and the one or more planar surfaces. The apparatus is also caused to construct at least one delivery path data object comprising at least one ordered list of the one or more shapes to represent the at least one delivery path.

According to another embodiment, an apparatus comprises means for determining at least one delivery path to at least one delivery surface, wherein the at least one delivery path represents at least one three-dimensional variable width path along which at least one aerial delivery vehicle can access the at least one delivery surface. The apparatus also comprises means for transecting the at least one delivery path with one or more planar surfaces. The apparatus further comprises means for determining one or more shapes on the one or more planar surfaces, wherein the one or more shapes represent one or more intersections of the at least one delivery path and the one or more planar surfaces. The apparatus also comprises means for constructing at least one delivery path data object comprising at least one ordered list of the one or more shapes to represent the at least one delivery path.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for constructing a delivery path that enables a UAV to safely access a delivery surface from the open sky are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
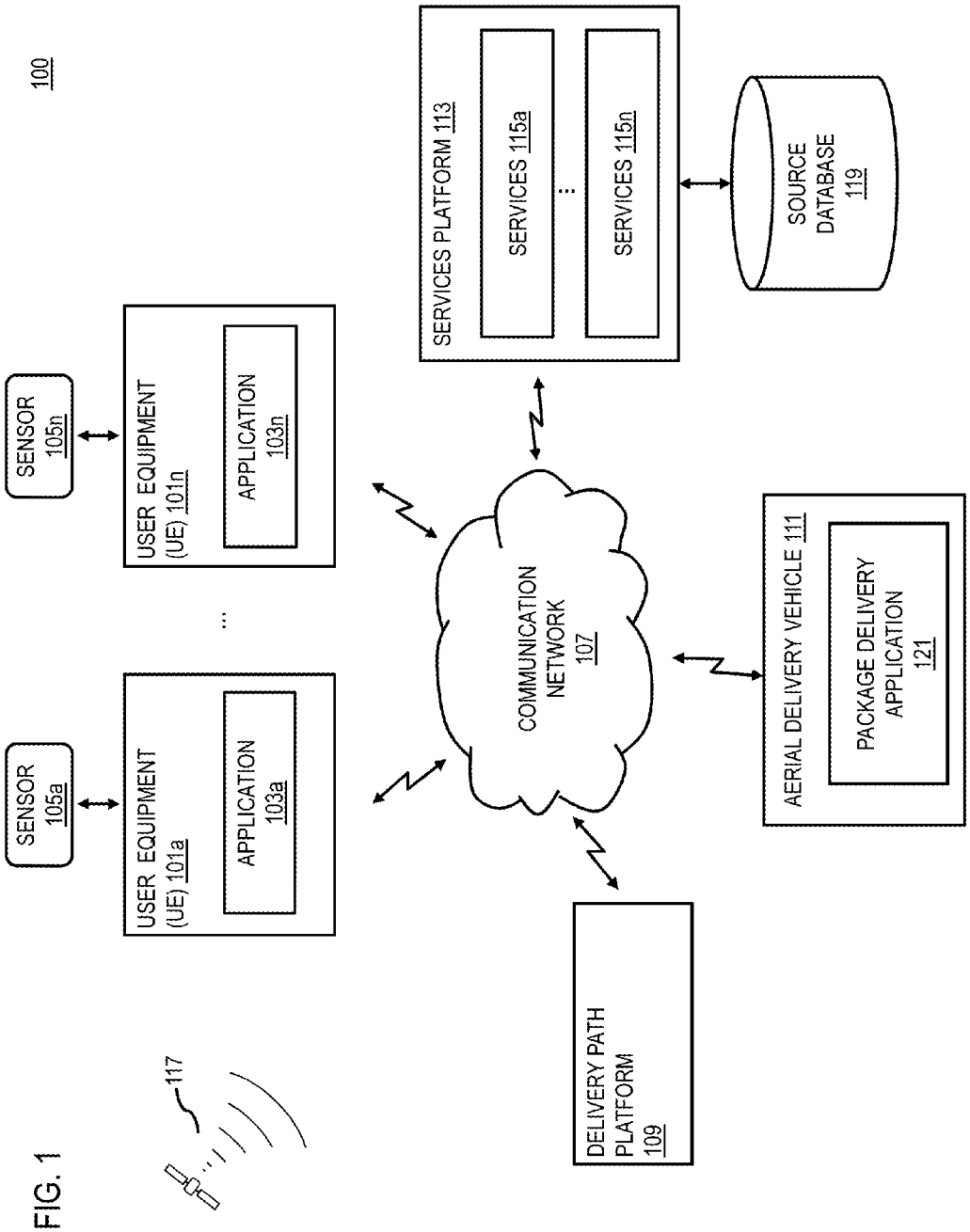
FIG. 1 is a diagram of a system capable of constructing a delivery path that enables a UAV to safely access a delivery surface from the open sky, according to one embodiment.

FIG. 1 is a diagram of a system capable of constructing a delivery path that enables a UAV to safely access a delivery surface from the open sky, according to one embodiment. As previously discussed, one area of interest among service providers and device manufacturers has been the delivery of goods via a UAV. Recently, there has been interest among various companies (e.g., Amazon, DHL, and Google) regarding aerial or drone-based package delivery services. One of the problems facing such a service is that UAVs can encounter significant technical challenges in detecting a delivery surface. By way of example, the delivery surface may be a driveway, a walkway (e.g., leading to a main entrance of a building or house), a porch (e.g., in front of the main entrance), a doorstep, etc. In addition, UAVs can encounter significant technical challenges in detecting obstructions proximate to and/or in route to a delivery surface (e.g., trees and/or tree branches, utility lines and/or utility poles, building structures, and the like). There may also be governmental laws or policies (e.g., required distances between objects) and/or environmental conditions (e.g., lighting, shear winds, vortices, etc.) that can affect a potential UAV delivery path and/or delivery. Consequently, while delivering a package at a geographic location (e.g., at a user's home), the UAV may not know upon which surface to deliver the package or whether an obstacle is present to prevent such a delivery and/or to damage the UAV (e.g., a tree branch). Petabytes of LIDAR data exist relative to such geographic locations as well as 2D/3D aerial imagery data. However, extracting and encoding such data for the purposes of constructing a UAV delivery path poses a significant technical challenge.

To address this problem, a system 100 of FIG. 1 introduces the capability to construct a delivery path that enables a UAV to safely access a delivery surface from the open sky via a delivery path. In one embodiment, the system 100 determines at least one delivery path to at least one delivery surface, wherein the at least one delivery path represents at least one three-dimensional (3D) variable width path along which at least one aerial delivery vehicle (e.g., a UAV) can access the at least one delivery surface. In one embodiment, the system 100 determines the at least one delivery path based, at least in part, on at least one ordered list of horizontal circles at various heights, wherein the ordered list determines the direction and width of the path for the UAV from the open sky to the delivery surface. In some circumstances, the system 100 may determine a delivery edge (i.e., a preferred edge or side) of the delivery surface for delivering a package. In one embodiment, the system 100 can determine that a middle of the delivery surface is the prescribed point of delivery.

In one embodiment, the system 100 determines at least one delivery path based, at least in part on 2D data, 3D data, or a combination thereof associated with the at least one delivery surface (e.g., a porch or a doorstep), one or more geographic areas proximate to the at least one delivery surface (e.g., a walkway), or a combination thereof. In one embodiment, the system 100 determines the 2D data, the 3D data, or a combination thereof from at least one street-level sensor (e.g., a LIDAR equipped vehicle), at least one aerial sensor (e.g., a UAV, satellite, or remote controlled plane), or a combination thereof. In one embodiment, the 2D data includes, at least in part, aerial image data (e.g., derived from a satellite, a UAV different than the delivery vehicle, a remote controlled plane, or the like) and the 3D data includes, at least in part, LIDAR data (e.g., one or more relevant LIDAR depth maps generated from the perspective of a collection vehicle).

In one embodiment, the system 100 transects the at least one delivery path with one or more planar surfaces (e.g., LIDAR horizontal slices). By way of example, the system 100 may determine the one or more planar surfaces (transections) at various heights (e.g., every meter) from the ground to the open sky. In one embodiment, wherein the one or more planar surfaces transect the at least one delivery path horizontally, vertically, or a combination thereof at one or more distance intervals (e.g., every meter), the system 100 determines the one or more distance intervals so that the one or more distance intervals span a first distance associated with the at least one delivery surface (e.g., a porch or a doorstep) to a second distance associated with at least one open area (e.g., the open sky). By way of example, the system 100 can determine a first planar surface at one meter above the delivery surface and a last planar surface at seven meters above the delivery surface. In one embodiment, the system 100 can determine that the one or more planar surfaces contain objects at a specific height surrounding the at least one delivery surface (e.g., based on the LIDAR horizontal slices). In one embodiment, the system 100 can determine or derive the at least one open area (e.g., the open sky) from building cartography data and 3D aerial imagery. In one embodiment, the system 100 can merge depth-map pixels 50% above and below each determined height to ensure objects between determined heights such as utility lines are accounted for in determining the at least one delivery path.

In one embodiment, the system 100 determines one or more shapes on the one or more planar surfaces, wherein the one or more shapes represent one or more intersections of the at least one delivery path and the one or more planar surfaces. In one embodiment, the ordered list of the one or more shapes (e.g., circles) specifies the direction and width of the path of a UAV tasked with delivering a package to the delivery surface. By way of example, the one or more shapes may be circles or "openings" or any closed shape having a centroid and/or geometric point. In one embodiment, the system 100 determines the one or more shapes based, at least in part, on one or more parameters such as one or more geometric points describing position information of the one or more intersections with respect to the one or more planar surfaces. The one or more parameters may include, for example, a width or a circumference of a UAV tasked with delivering a package, a turning radius of said UAV, one or more dimensions of the package to be delivered, or a combination thereof. In one embodiment, the system 100 determines the one or more geometric points based, at least in part, on at least one centroid of the one or more shapes, the at least one delivery path, or a combination thereof. In one embodiment, the determination of the one or more geometric points by the system 100 enables the system 100 to generate at least one 3D non-uniform rational basis (NURB) spline representing the precise flight path of at least one UAV between each centroid of the one or more shapes. In one embodiment, the UAV can use the NURB spline to stay within each of the one or more shapes (i.e., away from one or more obstructions) during the delivery of a package to a delivery surface.

In one embodiment, the system 100 determines the at least one delivery path based, at least in part, on one or more obstructions, one or more restricted paths, or a combination thereof associated with the at least one delivery surface, one or more geographic areas proximate to the at least one delivery surface, or a combination thereof. By way of example, the one or more obstructions may include, at least in part, trees or tree branches, utility lines or utility poles, building structures (e.g., a house), etc. The one or more restricted paths, for example, may include one or more governmental regulations that govern/restrict the path that a UAV may fly (e.g., Federal Aviation Administration (FAA) policies regarding required distances between objects). In one embodiment, the system 100 may also take into account one or more pertinent environmental conditions (e.g., lighting, sheer winds around a building, vortices, etc.) in determining the at least one delivery path.

In one embodiment, the system constructs at least one delivery path data object comprising at least one ordered list of the one or more shapes to represent the at least one delivery path. By way of example, the system 100 constructs the at least one delivery path data object based, at least in part, on at least one extraction algorithm. For example, in one embodiment, the system 100 generates the delivery path data object based, at least in part, on the following exemplary pseudo code:

```
<deliveryPath name="DP-1">
    <circles>
        <circle radius="2.0m" centroid="GP-1" />
        <circle radius="2.5m" centroid="GP-2" />
    </circles>
</deliveryPath >
``` wherein "GP-1" and "GP-2" represent ordered geometric points and wherein "GP-1" is located at the first planar surface or LIDAR horizontal slice from the delivery surface and "GP-2" is located at two planar surfaces or LIDAR horizontal slices from the delivery surface. In one embodiment, the system 100 can encode the one or more parameters (e.g., respective radii) in the at least one delivery path data object. By way of example, the system 100 may encode the parameter for each of the one or more shapes as <circle radius="2.0 m" centroid="GP-1"/>, <circle radius="2.5 m" centroid="GP-2"/>, etc. In one embodiment, the at least one delivery path is referenced by the at least one delivery surface such that <deliverySurface name="DS-1" path="DP-1">.

In one embodiment, the system 100 validates the at least one delivery path data object based, at least in part, on 2D data, 3D data, other 2D data, other 3D data, or a combination thereof associated with the at least one delivery surface (e.g., a porch or a doorstep), one or more geographic areas proximate to the at least one delivery surface (e.g., a walkway), or a combination thereof. For example, the system 100 can validate/refine the location and size of the one or more shapes based, at least in part, on the other 2D/3D data (e.g., 2D/3D aerial imagery). In one embodiment, because a LIDAR depth map generated from the perspective of a collection vehicle is often limited and cannot "see" behind the closest objects, the system 100 can further validate/refine the at least one delivery path by processing and/or facilitating a processing of the relevant 2D imagery in conjunction with feature recognition software (e.g., to identify openings) and by processing and/or facilitating a processing of the relevant 3D imagery in conjunction with image synthesis software (e.g., to determine the height of one or more objects proximate to the at least one delivery surface).

In one embodiment, the system 100 can determine at least one common section between the at least one delivery path and at least one other delivery path. By way of example, the system 100 may determine that at least one delivery path to one delivery surface (e.g., a doorstep at House A) shares a common section of at least one delivery path to an adjacent delivery surface (e.g., a doorstep at House B). By way of example, the at least one common section may be the delivery path from the open sky (e.g., starting at around 7 meters) down to a particular height above the two delivery surfaces (e.g., around 4 meters). In one embodiment, the system 100 can determine at least one portion of at least one other delivery path data object representing the at least one other delivery path. For example, the system 100 can determine that the at least one portion consists of three geometric points of the at least one other delivery path object. In one embodiment, the system 100 can share the at least one portion between the at least one delivery path data object and the at least one other delivery path data object. For example, the system 100 can encode common portions as a shared delivery path data object. In one embodiment, the system 100 can generate a shared delivery path data object based, at least in part, on the following exemplary pseudo code:

```
<deliveryPath name="DP-1"> . . . </deliveryPath> <!- common portion ->
<deliveryPath name="DP-2" path="DP-1"> . . . </deliveryPath>
<deliveryPath name="DP-3" path="DP-1"> . . . </deliveryPath>
```

In one embodiment, as discussed above, the one or more delivery paths are referenced by their respective delivery surfaces. Thus, each of the at least one delivery surfaces have one or more delivery paths:

```
<deliverySurface name="DS-1" path="DP-2">
<deliverySurface name="DS-2" path="DP-3">
```

In one embodiment, the system 100 can extract or determine the one or more planar surfaces, the one or more shapes, or a combination thereof from a LIDAR sensor positioned on the at least one delivery surface (e.g., a porch or a doorstep) in advance of the delivery. The system 100 may then determine the one or more shapes from at least one point cloud from the delivery surface to at least one open area (e.g., the open sky). In one embodiment, the at least one aerial sensor may comprise a "path extraction UAV" that is equipped with LIDAR. In one embodiment, the system 100 may use the at least one aerial sensor to determine one or more shapes from the open area (e.g., the open sky) to the delivery surface. In one embodiment, the system 100 may use aerial flyby stereo imagery or flyby LIDAR to determine or extract the one or more planar surfaces, the one or more shapes, or a combination thereof. In another embodiment, the system 100 can process and/or facilitate a processing of flight data determined from a UAV under remote pilot control to determine the one or more planar surfaces, the one or more shapes, or a combination thereof.

As shown in FIG. 1, the system 100 comprises user equipment (UE) 101a-101n (also collectively referred to herein as UEs 101) that may include or be associated with applications 103a-103n (also collectively referred to herein as applications 103) and sensors 105a-105n (also collectively referred to herein as sensors 105). In one embodiment, the UEs 101 have connectivity to a delivery path platform 109 via the communication network 107. In one embodiment, the delivery path platform 109 performs the functions associated with constructing a delivery path that enables a UAV to safely access a delivery surface from the open sky.

By way of example, a UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 101 can support any type of interface to the user (such as "wearable" circuitry, etc.). In one embodiment, a UE 101 may support any type of interface for supporting the presentment of geographic delivery locations to a UAV 111 or aerial based package delivery vehicle for delivering packages. In addition, a UE 101 may facilitate various input means for receiving and generating information, including, but not restricted to, a touch screen capability, a keyboard and keypad data entry, a voice-based input mechanism, and the like. Any known and future implementations of a UE 101 may also be applicable.

By way of example, the applications 103 may include various applications such as an ecommerce application, a package tracking/reading application, a location-based service application, a navigation application, a content provisioning application, a camera/imaging application, a media player application, a social networking application, and the like. In one embodiment, the applications 103 may include one or more feature recognition applications used for identifying openings in 2D imagery. In one embodiment, the applications 103 may also include one or more image synthesis applications used to determine respective heights of objects included in 3D imagery. In one embodiment, one of the applications 103 may act as a client for the delivery path platform 109 and perform one or more functions of the delivery path platform 109. In one embodiment, an application 103 may be considered as a Graphical User Interface (GUI) that can enable a user to purchase one or more items from an ecommerce website and thereafter select a delivery location (e.g., a porch or a doorstep) for the delivery of the purchased item. In another embodiment, an application 103 may generate one or more notifications for informing a user about an inbound delivery of a purchased item. For example, the notification may provide data such as the day, time, and specific location of the delivery.

By way example, the sensors 105 may be any type of sensor. In certain embodiments, the sensors 105 may include a global positioning system (GPS) sensor for gathering location data, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, a package tracking sensor for tracking package movement, and the like.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the services platform 113 may include any type of service. By way of example, the services platform 113 may include content (e.g., LIDAR data, building cartography data, 2D/3D aerial imagery, etc.), provisioning services, application services, storage services, mapping services, navigation services, contextual information determination services, location-based services, information-based services (e.g., weather), etc. In one embodiment, the services platform 113 may interact with the UEs 101, the delivery path platform 109, and the UAV 111 to supplement or aid in processing of the delivery path information.

By way of example, services 115a-115n (also collectively referred to herein as services 115) may include LIDAR provisioning services, 2D/3D aerial imagery provisioning services, and the like. In one embodiment, the services 115 also include feature recognition related services and image synthesis services. One or more of the services 115 may also have access to building or home schematics, pedestrian probes, sensors such as the sensors 105, or a combination thereof. In one embodiment, the content may be retrieved from satellites 117 in real time. In one embodiment, the services platform 115 may include or be associated with at least one database 119. By way of example, the at least one database 119 may include, at least in part, LIDAR data, 2D/3D aerial imagery data, governmental policies/restrictions data, depth-map data, building cartography data, etc.

In one embodiment, the system 100 includes a UAV 111 (e.g., an aerial delivery vehicle) for delivering a package to a delivery surface from the open sky. In one embodiment, the UAV 111 is connected to or associated with a package delivery application 121.

By way of example, the UEs 101, delivery path platform 109, the UAV 111, the services platform 113, and satellites 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
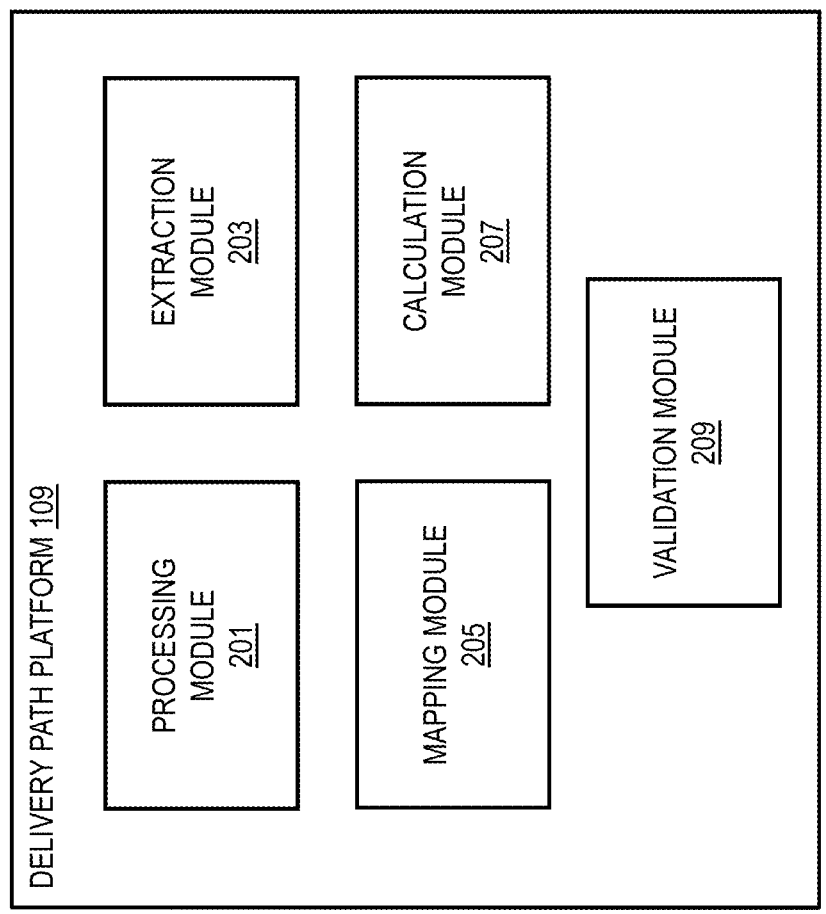
FIG. 2 is a diagram of the components of a delivery path platform, according to one embodiment.

FIG. 2 is a diagram of the components of a delivery path platform 109, according to one embodiment. By way of example, the delivery path platform 109 includes one or more components for providing constructing a delivery path that enables a UAV to safely access a delivery surface from the open sky. It is contemplated that the functions of these components may be combined in one or more components or performed by other components of equivalent functionality. In this embodiment, the delivery path platform 109 includes a processing module 201, an extraction module 203, a mapping module 205, a calculation module 207, and a validation module 209, or any combination thereof.

In one embodiment, the processing module 201 is used to determine at least one delivery path to at least one delivery surface. By way of example, the processing module 201 may determine at least one delivery path based, at least in part, on a determination of at least one ordered list of one or more shapes (e.g., circles) on one or more planar surfaces (e.g., LIDAR horizontal slices) at various heights (e.g., at 1 meter intervals). The processing module 201 may also be used to construct at least one delivery path data object comprising the at least one ordered list of the one or more shapes to represent the at least on delivery path. The delivery path data object represents the variable width path a UAV (e.g., UAV 111) flies in order to access a delivery surface from the open sky. By way of example, the processing module 201 may construct the at least one delivery path data object based, at least in part, on an extraction algorithm. For example, in one embodiment, the processing module 201 may generate the delivery path data object based, at least in part, on the following exemplary pseudo code:

```
<deliveryPath name="DP-1">
  <circles>
    <circle radius="2.0m" centroid="GP-1" />
    <circle radius="2.5m" centroid="GP-2" />
  </circles>
</deliveryPath >
```

The processing module 201 may also be used to encode one or more parameters in the at least one delivery path data object. For example, the one or more parameters include, at least in part, one or more geometric points describing position information of the one or more intersections with respect to the one or more planar surfaces. In one embodiment, the processing module 201 also may be used to determine at least one common section between the at least one delivery path and at least one other delivery path. By way of example, the processing module 201 may determine that at least one delivery path to at least one delivery surface shares a common section with at least one delivery path to at least one adjacent delivery surface. The processing module 201 may also be used to determine at least one portion of at least one other delivery path data object representing the at least one other delivery path. For example, the processing module 201 can determine that three planar surfaces (e.g., LIDAR horizontal slices) of the at least one other delivery path data object are relevant to the at least one delivery path data object. The processing module 201 also may be used to share at least one portion between at least one delivery path data object and at least one other delivery path data object. By way of example, the processing module 201 can encode common portions as at least one shared delivery path data object.

The extraction module 203 is used in certain embodiments to determine at least one delivery path based, at least in part, on 2D data, 3D data, or a combination thereof associated with at least one delivery surface, one or more geographic areas proximate to the at least one delivery surface, or a combination thereof. By way of example, the extraction module 203 may extract or determine the 2D data from aerial or satellite imagery data and may extract or determine the 3D data from LIDAR data (e.g., LIDAR depth maps generated from the perspective of a collection vehicle). The extraction module 203 may also be used to determine at least one delivery path based, at least in part, on one or more obstructions (e.g., tree branches and/or power lines), one or more restricted paths (e.g., required distances between objects), or a combination thereof associated with at least one delivery surface, one or more geographic areas proximate to the at least one delivery surface, or a combination thereof. By way of example, the extraction module 203 may determine the presence of one or more trees and/or tree branches, one or more utility lines and/or utility poles, one or more building structures, or a combination thereof present in the 2D data, the 3D data, or a combination thereof. Likewise, the extraction module 203 may extract or determine one or more restricted paths based, at least in part, on one or more governmental regulations (e.g., FAA policies).

In one embodiment, the mapping module 205 is used to transect at least one delivery path with one or more planar surfaces. By way of example, the mapping module 205 can transect the one or more planar surfaces (e.g., LIDAR horizontal slices) at various heights (e.g., every meter) from the ground to the open sky. The mapping module 205 may also be used to determine the one or more distance intervals (e.g., every meter) so that the one or more distance intervals span a first distance associated with at least one delivery surface (e.g., a porch or doorstep) to a second distance associated with at least one open area (e.g., the open sky). By way of example, the mapping module 205 can determine a first planar surface (horizontal slice) at one meter above the delivery surface (e.g., a porch) and a last planar surface at seven meters above the delivery surface. The mapping module 205 also may be used to determine one or more shapes (e.g., a circle) on the one or more planar surfaces, wherein the one or more shapes represent one or more intersections of the at least one delivery path and the one or more planar surfaces. By way of example, the mapping module 205 may determine the one or more shapes based, at least in part, on one or more parameters such as one or more geometric points describing position information of the one or more intersections with respect to the one or more planar surfaces.

The calculation module 207 in certain embodiments is used to determine one or more parameters for describing the one or more shapes. By way of example, the calculation module 207 can describe the one or more shapes (e.g., circles) based, at least in part, on one or more parameters including, at least in part, one or more geometric points (e.g., a centroid) describing position information of the one or more intersection with respect to the one or more planar surfaces. The calculation module 207 can also describe the one or more shapes based, at least in part, on a width or a circumference of a UAV tasked with delivering a package to the delivery surface, a turning radius of said UAV, one or more dimensions of the package to be delivered, or a combination thereof. The calculation module 207 may also be used to determine one or more geometric points based, at least in part, on at least one centroid of the one or more shapes, at least of one delivery path, or a combination thereof. In one embodiment, the determination of the one or more geometric points by the calculation module 207 enables the mapping module 205 to generate at least one 3D NURB spline that represents the precise flight path of at least one UAV between each centroid of the one or more shapes. In one embodiment, the at least one UAV can use the NURB spline to stay within each of the one or more shapes (i.e., away from one or more obstructions) during the delivery of a package from the open sky to a delivery surface.

In one embodiment, the validation module 209 is used to validate at least one delivery path data object using 2D data, 3D data, or a combination thereof associated with at least one delivery surface (e.g., a porch or a doorstep), one or more geographic areas proximate to the delivery surface (e.g., a walkway), or a combination therefore. By way of example, the validation module 209 can use other 2D/3D data (e.g., 2D/3D aerial imagery) to validate/refine the location and size of the one or more shapes. In one embodiment, the validation module 209 can process and/or facilitate a processing of the relevant 2D imagery in conjunction with feature recognition software to identify the one or more shapes or openings and the validation module 209 can also process and/or facilitate a processing of the 3D imagery to determine respective heights of objects within the 3D imagery.

Figure 3:
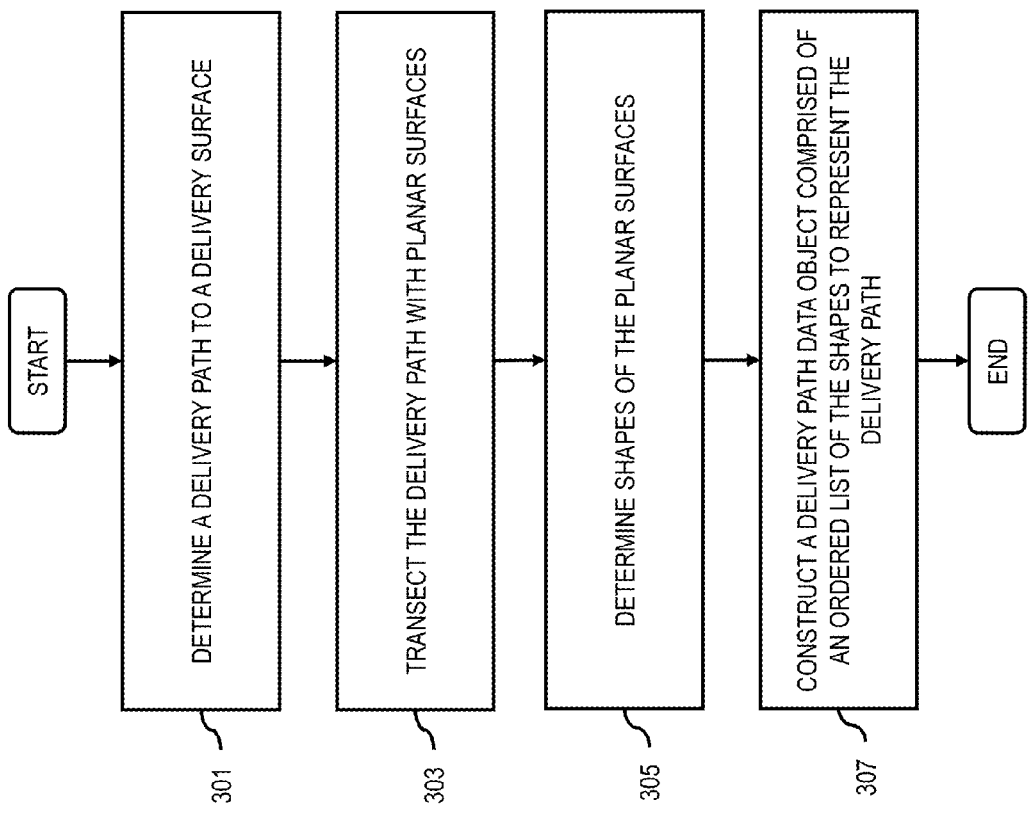
FIG. 3 is a flowchart of a process for constructing a delivery path that enables a UAV to safely access a delivery surface from the open sky, according to one embodiment.
Figure 11:
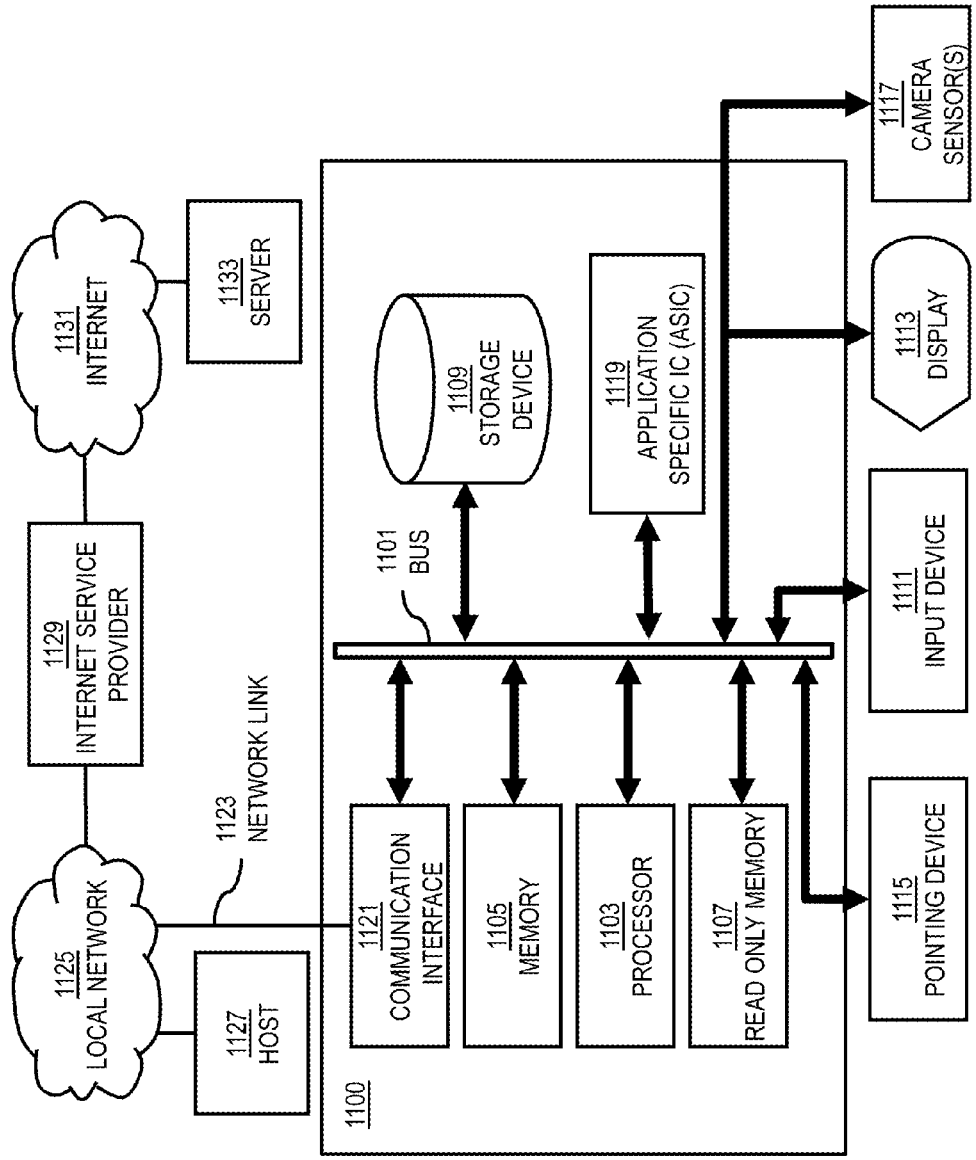
FIG. 11 is a diagram of hardware that can be used to implement an embodiment of the invention.

FIG. 3 is a flowchart of a process for constructing a delivery path that enables a UAV to safely access a delivery surface from the open sky, according to one embodiment. In one embodiment, the delivery path platform 109 performs the process 300 and is implemented in, for instance, a chip set including a processor and a memory as shown in FIG. 11. In step 301, the delivery path platform 109 determines at least one delivery path to at least one delivery surface, wherein the at least one delivery path represents at least one three-dimensional variable width path along which at least one aerial delivery vehicle can access the at least one delivery surface. By way of example, a delivery surface may be a driveway, a walkway (e.g., leading to a main entrance of a building or house), a porch (e.g., in front of the main entrance), a doorstep, etc. In one embodiment, the delivery path platform 109 determines the at least one delivery path based, at least in part, on at least one ordered list of horizontal circles at various heights, wherein the ordered list determines the direction and width of the path for the UAV delivery the package to the delivery surface.

In step 303, the delivery path platform 109 transects the at least one delivery path with one or more planar surfaces. By way of example, the delivery path platform 109 may determine one or more planar surfaces (i.e., transections) at various heights (e.g., every meter) from the ground to the open sky (e.g., from 1 meter to 7 meters above the delivery surface).

In step 305, the delivery path platform 109 determines one or more shapes on the one or more planar surfaces, wherein the one or more shapes represent one or more intersections of the at least one delivery path and the one or more planar surfaces. By way of example, the one or more shapes may be circles or any closed shape that has a centroid and/or geometric point. In one embodiment, the one or more shapes specify the direction and width of the path for the UAV tasked with delivering a package to a delivery surface.

In step 307, the delivery path platform 109 constructs at least one delivery path data object comprising at least one ordered list of the one or more shapes to represent the at least one delivery path. By way of example, the delivery path platform 109 can construct the least one delivery path data object based, at least in part, on at least one extraction algorithm. For example, in one embodiment, the delivery path platform 109 generates the delivery path data object based, at least in part, on the following exemplary pseudo code:

```
<deliveryPath name="DP-1">
  <circles>
    <circle radius="2.0m" centroid="GP-1" />
    <circle radius="2.5m" centroid="GP-2" />
  </circles>
</deliveryPath >
``` wherein "GP-1" and "GP-2" represent ordered geometric points and wherein "GP-1" is located at the first planar surface or LIDAR horizontal slice from the delivery surface (e.g., a porch or doorstep) and "GP-2" is located at two planar surfaces or horizontal slices from the delivery surface.

Figure 4:
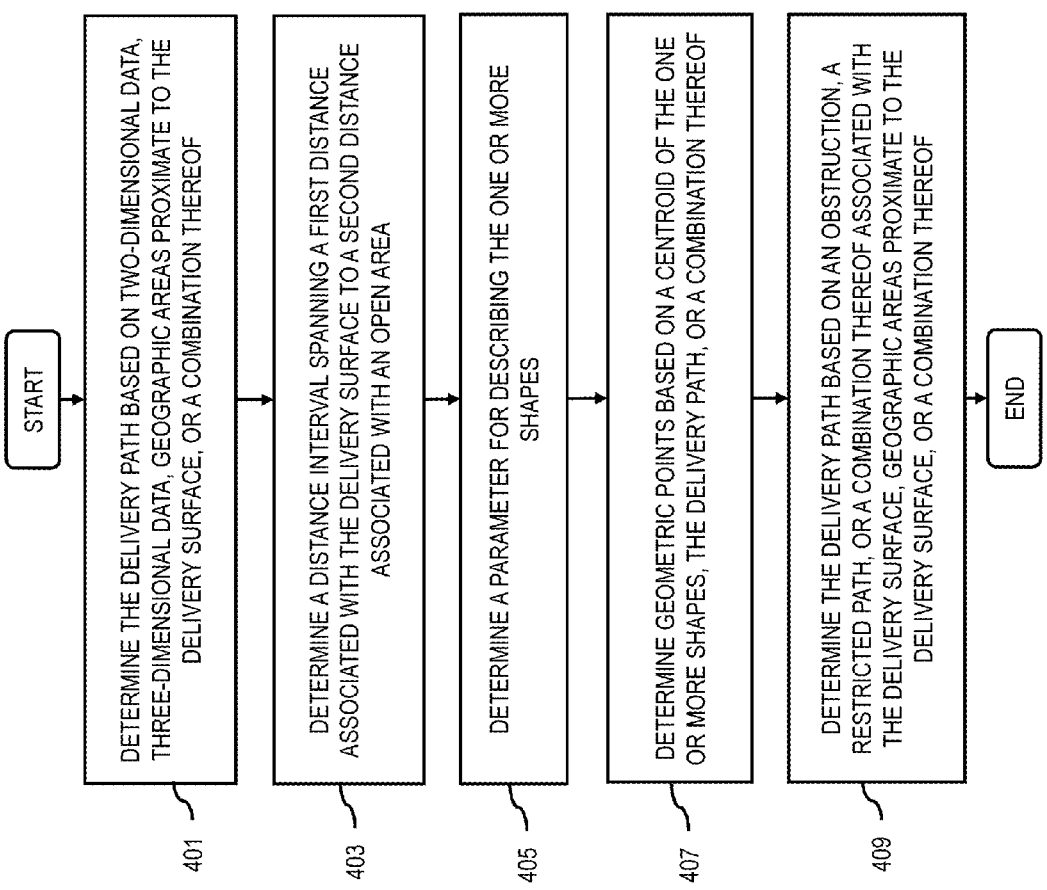
FIG. 4 is a flowchart of a process for extracting delivery path information from one or more data sources and determining the direction and width of the UAV delivery path, according to one embodiment.

FIG. 4 is a flowchart of a process for extracting delivery path information from one or more data sources and determining the direction and width of the UAV delivery path, according to one embodiment. In one embodiment, the delivery path platform 109 performs the process 400 and is implemented in, for instance, a chip set including a processor and a memory as shown in FIG. 11. In step 401, the delivery path platform 109 determines the at least one delivery path based, at least in part, on two-dimensional data, three-dimensional data, or a combination thereof associated with the at least one delivery surface, one or more geographic areas proximate to the at least one delivery surface, or a combination thereof, wherein the two-dimensional data include, at least in part, aerial image data, and the three-dimensional data include, at least in part, LIDAR data. In one embodiment, the delivery path platform 109 may determine the 2D data, the 3D data, or a combination thereof from at least one street-level sensor (e.g., a LIDAR equipped vehicle), at least one aerial sensor (e.g., a UAV, a satellite, or a remote-controlled plane), or a combination thereof. By way of example, the delivery path platform 109 may determine the aerial image data from a satellite, a UAV different form the delivery vehicle, a remote controlled plane, or the like.

In step 403, wherein the one or more planar surfaces transect the at least one delivery path horizontally, vertically, or a combination thereof at one or more distance intervals, the delivery path platform 109 determines the one or more distance intervals so that the one or more distance intervals span a first distance associated with the at least one delivery surface to a second distance associated with at least one open area. By way of example, the one or more distance intervals may be one or more distance intervals associated with the 3D data (e.g. LIDAR depth maps). For example, the delivery path platform 109 may determine a first planar surface at one meter above the delivery surface and a last planar surface at seven meters above the delivery surface (e.g., the open sky).

In step 405, the delivery path platform 109 determines one or more parameters for describing the one or more shapes. By way of example, the one or more parameters include, at least in part, one or more geometric points describing position information of the one or more intersections with respect to the one or more planar surfaces. The one or more parameters may include, for example, a width or a circumference of a UAV tasked with delivering a package, a turning radius of said UAV, one or more dimensions of the package to be delivered, or a combination thereof.

In step 407, the delivery path platform 109 determines the one or more geometric points based, at least in part, on at least one centroid of the one or more shapes, the at least one delivery path, or a combination thereof. For example, the one or more geometric points can be used by the delivery path platform 109 to generate at least one NURB spline representing the precise flight path of at least one UAV between each centroid of the one or more shapes. In one embodiment, the at least one UAV can use the NURB spline to stay within each of the one or more shapes (i.e., away from one or more obstructions) during the delivery of a package from the open sky to a delivery surface (e.g., a porch or a doorstep).

In step 409, the delivery path platform 109 determines the at least one delivery path based, at least in part, on one or more obstructions, one or more restricted paths, or a combination thereof associated with the at least one delivery surface, one or more geographic areas proximate to the at least one delivery surface, or a combination thereof. By way of example, the one or more obstructions may include, at least in part, trees and/or tree branches, utility lines and/or utility poles, building structures (e.g., a house), and the like. The one or more restricted paths, for example, may include one or more governmental regulations (e.g., FAA policies) that govern/restrict the path that a UAV may fly (e.g., required distances between objects). In one embodiment, the delivery path platform 109 may also take into account one or more relevant environmental conditions (e.g., lighting, sheer winds around a building, vortices, etc.) in determining the at least one delivery path.

Figure 5:
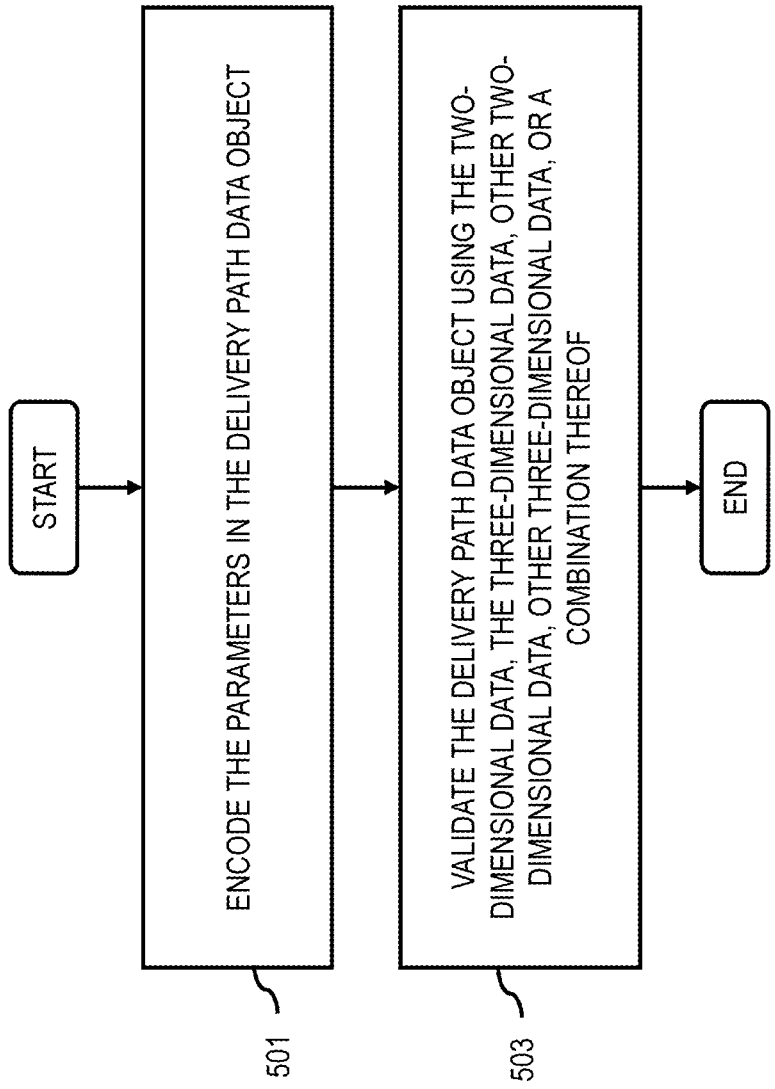
FIG. 5 is a flowchart of a process for encoding and validating the delivery path data object, according to one embodiment.

FIG. 5 is a flowchart of a process for encoding and validating the delivery path data object, according to one embodiment. In one embodiment, the delivery path platform 109 performs the process 500 and is implemented in, for instance, a chip set including a processor and a memory as shown in FIG. 11. In step 501, the delivery path platform 109 encodes the one or more parameters in the at least one delivery path data object. By way of example, the delivery path platform 109 can encode the one or more parameters (e.g., a radius) as follows: <circle radius="2.0 m" centroid "GP-1"/>, <circle radius="2.5 m" centroid="GP-2"/>, etc.

In step 503, the delivery path platform 109 validates the at least one delivery path data object using the two-dimensional data, the three-dimensional data, other two-dimensional data, other three-dimensional data, or a combination thereof associated with the at least one delivery surface, one or more geographic areas proximate to the at least one delivery surface, or a combination thereof. By way of example, the delivery path platform 109 can validate/refine the location and size of the one or more shapes based, at least in part, on the other two-dimensional data, the other three-dimensional data, or a combination thereof (e.g., 2D/3D aerial imagery). In one embodiment, the delivery path platform 109 can also validate/refine the at least one delivery path data object by processing and/or facilitating a processing of the relevant 2D imagery in conjunction with feature recognition software (e.g., to identify the one or more shapes or openings) and by processing and/or facilitating a processing of the relevant 3D imagery in conjunction with image synthesis software (e.g., to determine the height of one or more objects proximate to the at least one delivery surface).

Figure 6:
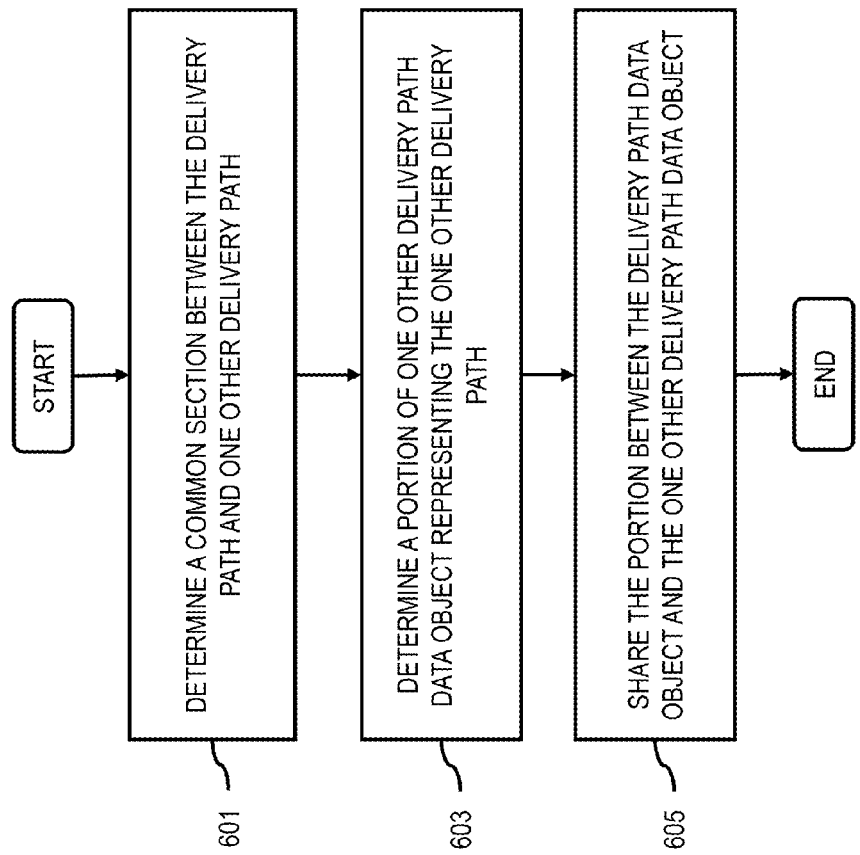
FIG. 6 is a flowchart of a process for generating a shared delivery path data object representing a common section among at least two delivery paths, according to one embodiment.

FIG. 6 is a flowchart of a process for generating a shared delivery path data object representing a common section among at least two delivery paths, according to one embodiment. In one embodiment, the delivery path platform 109 performs the process 600 and is implemented in, for instance, a chip set including a processor and a memory as shown in FIG. 11. In step 601, the delivery path platform 109 determines at least one common section between the at least one delivery path and at least one other delivery path. By way of example, the at least one common section may be a delivery path or a portion of a delivery path shared by the at least one delivery path (e.g., a delivery surface at House A) and at least one other delivery path (e.g., a delivery surface at House B). For example, the at least one common section may be the delivery path from the open sky (e.g., starting at around 7 meters) down to a particular height above the two delivery surfaces (e.g., around 4 meters).

In step 603, the delivery path platform 109 determines at least one portion of at least one other delivery path data object representing the at least one other delivery path. By way of example, the delivery path platform 109 can determine that the at least one portion consists of three geometric points (e.g., GP-4, GP-5, and GP-6) of the at least one other delivery path data object.

In step 605, the delivery path platform 109 shares the at least one portion between the at least one delivery path data object and the at least one other delivery path data object. By way of example, the delivery path platform 109 can encode common portions as a shared delivery path data object. For example, the delivery path platform 109 can generate the shared delivery path data object based, at least in part, on the following exemplary pseudo code:

<deliveryPath name="DP-1"> . . . </deliveryPath> <!- common portion ->
<deliveryPath name="DP-2" path="DP-1"> . . . </deliveryPath>
<deliveryPath name="DP-3" path="DP-1"> . . . </deliveryPath>

In one embodiment, as discussed above, the one or more delivery paths are referenced by their respective delivery surfaces. Thus, each of the at least one delivery surfaces have one or more delivery paths:

<deliverySurface name="DS-1" path="DP-2">
<deliverySurface name="DS-2" path="DP-3">

Figure 7:
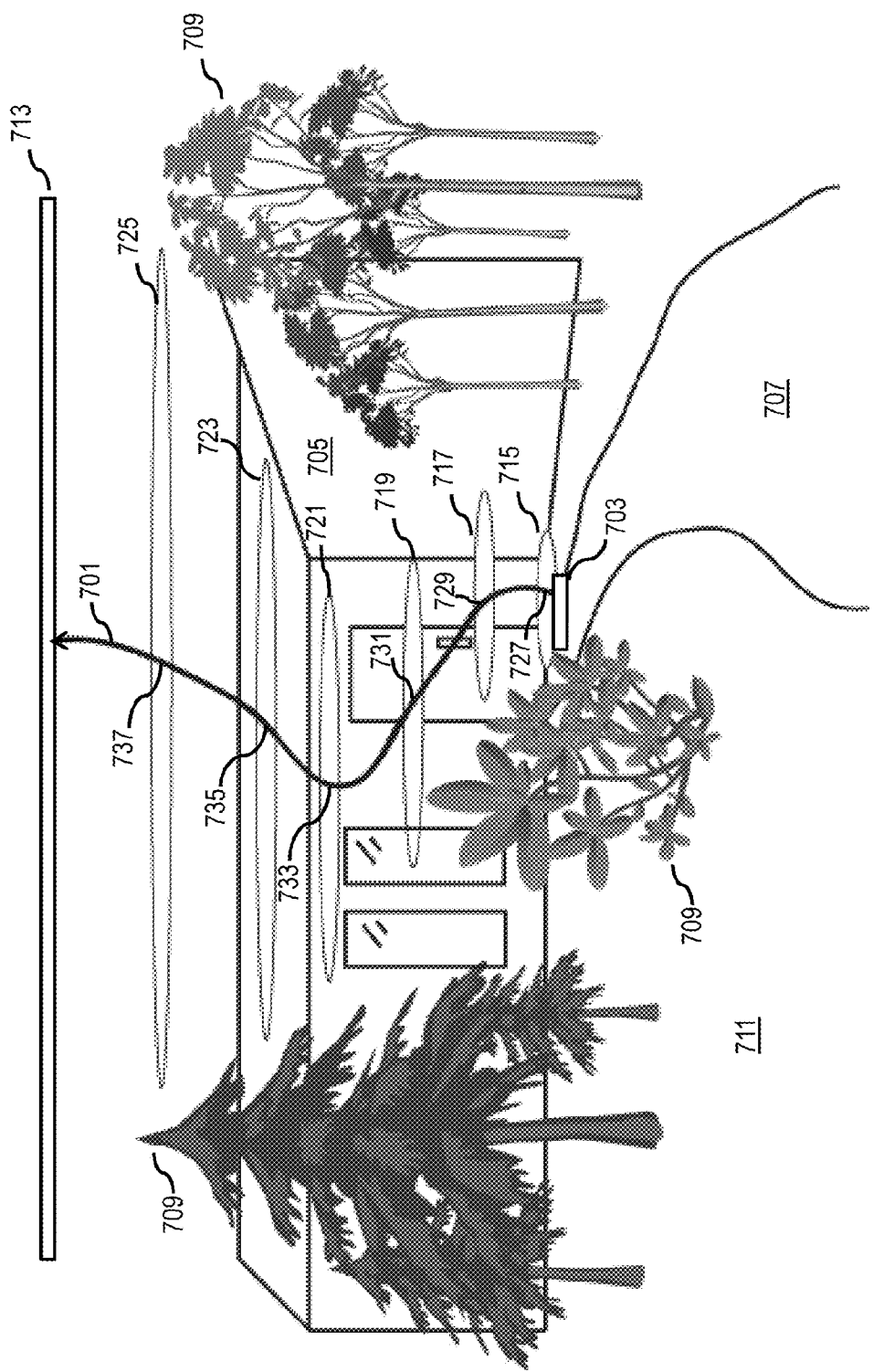
FIG. 7 is a diagram of a delivery path associated with a building and/or a geographic address, according to one example embodiment.

FIG. 7 is a diagram of a delivery path associated with a building and/or geographic address, according to one example embodiment. In one embodiment, the system 100 determines a delivery path 701 (e.g., DP-1) to a delivery surface 703 (e.g., a doorstep) associated with a house 705, wherein the delivery path 701 represents a 3D variable width path along which a UAV (not shown for illustrative convenience) can access the delivery surface 703 (e.g., to deliver a package). In one embodiment, the system 100 determines the delivery path 701 based, at least in part, on 2D data, 3D data, or a combination thereof associated with the delivery surface 703, one or more geographic areas proximate to the delivery surface 703 (e.g., the house 705 or the walkway 707), or a combination thereof. In one embodiment, the 3D data (e.g., one or more LIDAR depth maps of the house 705) may be generated from the perspective of a collection vehicle (not shown for illustrative convenience) that has passed by the house 705. By way of example, the LIDAR data may include information about both the house 705 and the trees/bushes 709.

In one embodiment, the system 100 transects the delivery path 701 with the one or more planar surfaces (e.g., LIDAR horizontal slices) (not shown for illustrative convenience). By way of example, the system 100 may determine the one or more planar surfaces or transections at various heights (e.g., every meter) from the ground 711 to the open sky 713. In one embodiment, the system 100 determines one or more shapes (e.g., circles 715 through 725) on the one or more planar surfaces, wherein the one or more shapes represent one or more intersections of the delivery path 701 and the one or more planar surfaces. In one embodiment, the ordered list of one or more shapes (e.g., circles 715 through 725) specify the direction and width of the path of the UAV tasked with delivering a package to the delivery surface 703. In one embodiment, the system 100 determines the one or more shapes based, at least in part, on one or more parameters such as the geometric points 727 through 737 describing position information of the one or more intersections with respect to the one or more planar surfaces. In one embodiment, the system 100 determines the geometric points 727 through 737 based, at least in part, on the at least one centroid of the circles 715 through 725, the delivery path 701, or a combination thereof. In one embodiment, the geometric points 727 through 737 can be used by the system 100 to generate at least one 3D NURB spline (delivery path 701) representing the precise flight path of the UAV between the geometric points 727 through 737 of the circles 715 through 725, respectively. In one embodiment, the UAV can use the NURB spline to stay within each of the circles 715 through 725 (i.e., away from one or more obstructions 709) during the delivery of a package from the open sky 713 to the delivery surface 703. In one embodiment, the system 100 also determines the delivery path 701 based, at least in part, on one or more obstructions (e.g., trees and/or bushes 709), one or more restricted paths (e.g., a required distance between the house 705 and the UAV), or a combination thereof associated with the delivery surface 703, one or more geographic areas proximate to the delivery surface 703 (e.g., the house 705 and the walkway 707), or a combination thereof.

Figure 8:
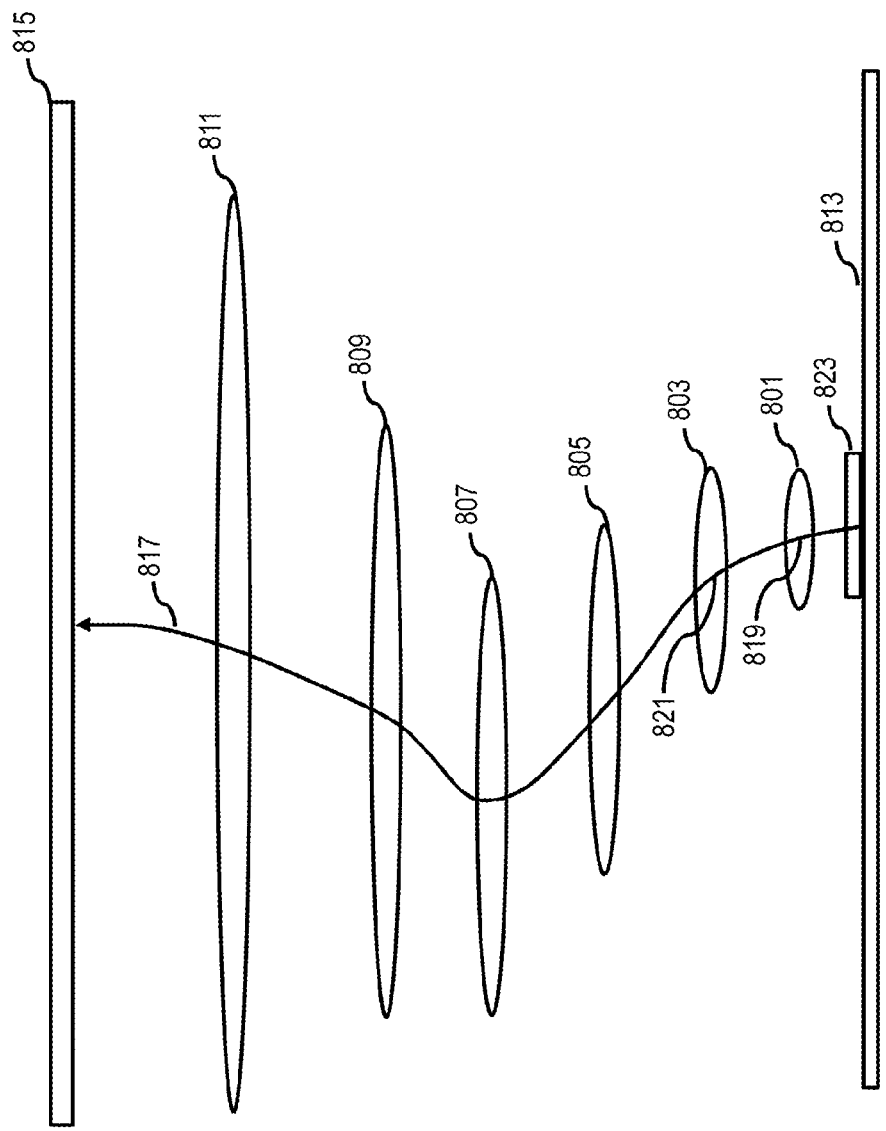
FIG. 8 is a schematic diagram of a delivery path, according to one example embodiment.

FIG. 8 is a schematic diagram of a delivery path, according to one example embodiment. In one embodiment, the system 100 can construct at least one delivery path data object (not shown for illustrative convenience) including, at least in part, at least one ordered list of the one or more shapes (e.g., circles 801 through 811) from the ground 813 to the open sky 815 to represent the delivery path 817. For example, in one embodiment, the system 100 may generate the delivery path data object based, at least in part, on the following exemplary pseudo code:

```
<deliveryPath name="DP-1">
    <circles>
        <circle radius="2.0m" centroid="GP-1" />
        <circle radius="2.5m" centroid="GP-2" />
    </circles>
</deliveryPath >
``` wherein "GP-1" and "GP-2" represent ordered geometric points 819 and 821, respectively, and wherein "GP-1" is located at the first planar surface or LIDAR horizontal slice (not shown for illustrative convenience) from the delivery surface 823 and "GP-2" is located at two planar surfaces or LIDAR horizontal slices (not shown for illustrative convenience) from the delivery surface 823. In one embodiment, the system 100 encodes the one or more parameters (e.g., a radius for each of the circles 801 through 811) in the at least one delivery path data object. Consequently, in one embodiment, the precise UAV flight path 817 is derived from the centroid of each circle 801 through 811. By way of example, the UAV can use the at least one delivery path data object to stay within the circles 801 through 811 and away from one or more obstructions (e.g., trees or tree branches) during the delivery of a package from the open sky 815 to the delivery surface 823 (i.e., along delivery path 817). In one embodiment, the delivery path 817 is referenced by the delivery surface 823 such that <deliverySurface name="DS-1" path="DP-1">.

Figure 9:
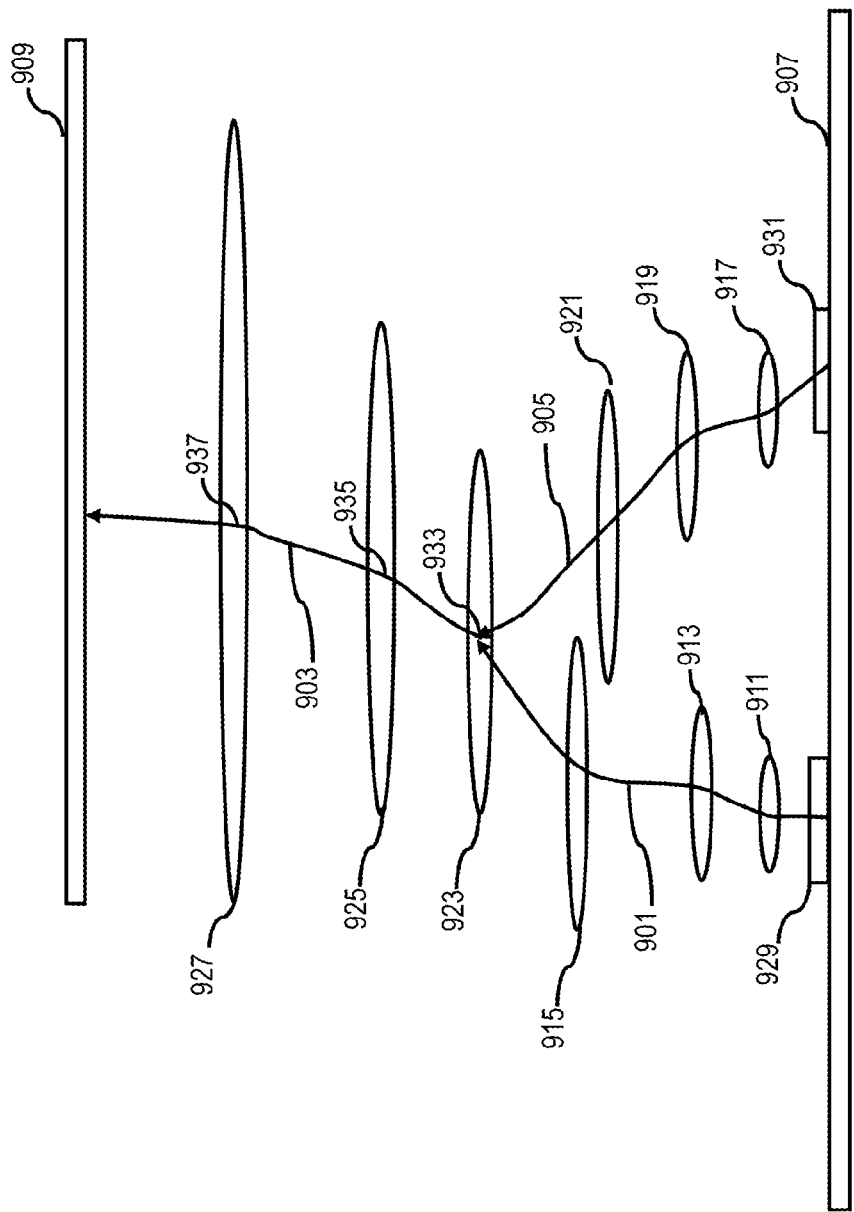
FIG. 9 is a schematic diagram of a shared delivery path, according to one example embodiment.

FIG. 9 is a schematic diagram of a shared delivery path, according to one example embodiment. In one embodiment, the system 100 determines at least one common section between at least one delivery path (e.g., delivery paths 901 and 903) and at least one other delivery path (e.g., delivery paths 903 and 905) between the ground 907 and the open sky 909. In this example, the delivery path 901 includes the ordered list of circles 911, 913, and 915; the delivery path 905 includes the ordered list of circles 917, 919, and 921; and the delivery path 903 includes the ordered list of circles 923, 925, and 927. By way of example, the system 100 may determine that the delivery paths 901 and 903 to the delivery surface 929 share a common section (e.g., delivery path 903) to an adjacent delivery surface 931. For example, the delivery surfaces 929 and 931 may be associated with two different structures or they may be associated with two different deliveries at the same geographic location by two different UAVs (not shown for illustrative convenience). In one embodiment, the system 100 determines at least one portion of at least one other delivery path data object (not shown for illustrative convenience) representing the at least one other delivery path (e.g., delivery paths 903 and 905). For example, the system 100 can determine that the at least one portion consists of geometric points 933, 935, and 937 of circles 923, 925, and 927, respectively. In one embodiment, the system 100 can share the at least one portion between the at least one delivery path data object (not shown for illustrative convenience) and the at least one other delivery path data object. For example, the system 100 can encode the common portions as a shared delivery path data object (not shown for illustrative convenience). In one embodiment, the system 100 can generate a shared delivery path data object based, at least in part, on the following exemplary pseudo code:

```
<deliveryPath name="DP-1"> . . . </deliveryPath> <!- common portion ->
<deliveryPath name="DP-2" path="DP-1"> . . . </deliveryPath>
<deliveryPath name="DP-3" path="DP-1"> . . . </deliveryPath>
```

In one embodiment, as discussed above, the one or more delivery paths (e.g., delivery paths 901 and 903 and 903 and 905 are referenced by their respective delivery surfaces (e.g., delivery surfaces 929 and 931, respectively). Thus, delivery surfaces 929 and 931 have one or more delivery paths:

```
<deliverySurface name="DS-1" path="DP-2">
<deliverySurface name="DS-2" path="DP-3">
```

Figure 10:
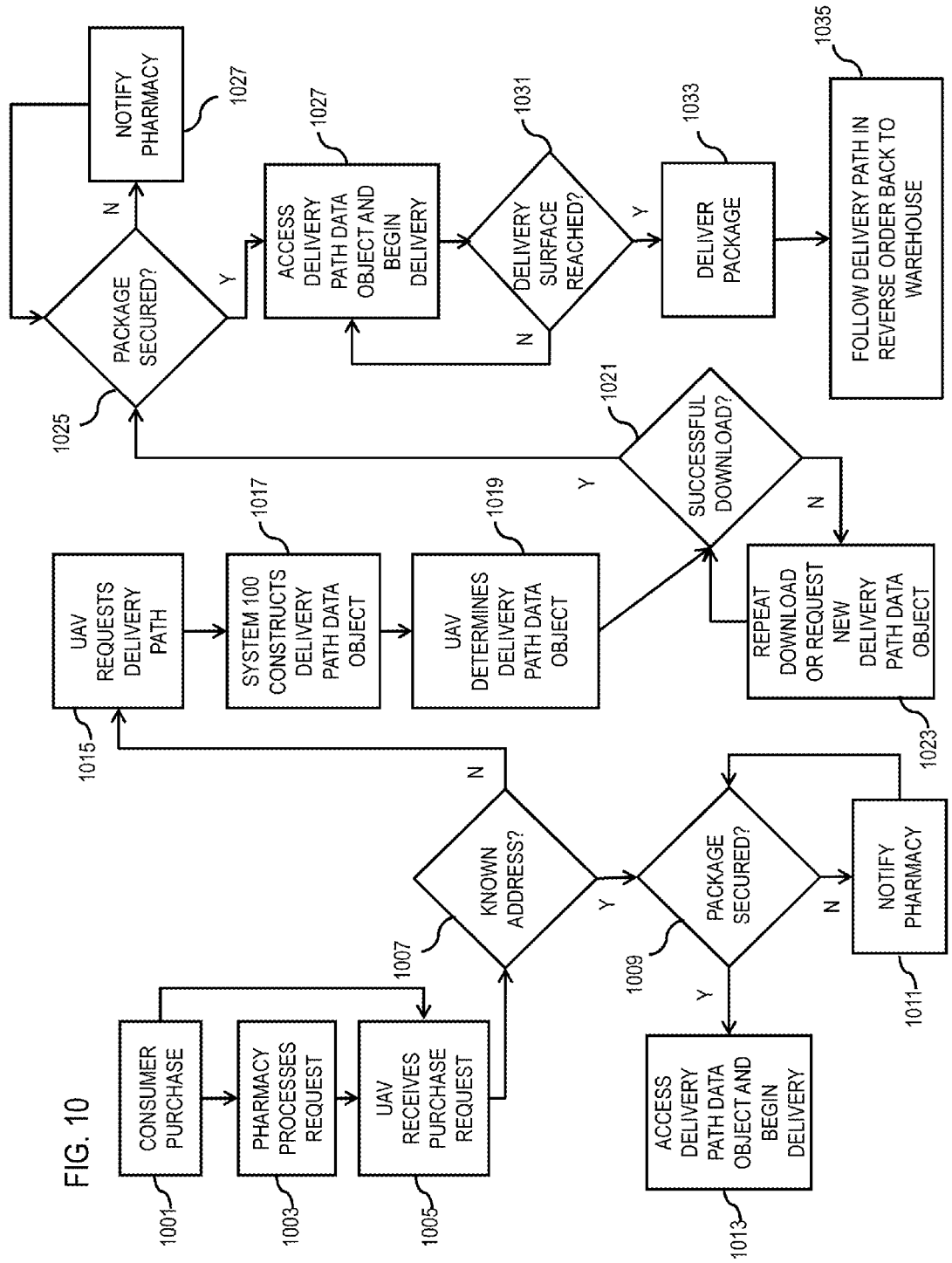
FIG. 10 is a flow chart describing a process of a UAV accessing a delivery path data object to deliver a package to a delivery surface; according to one example embodiment.

FIG. 10 is a flow chart describing a process of a UAV accessing a delivery path data object to deliver a package to a delivery surface; according to one example embodiment. In step 1001, a user purchases an item (e.g., a prescription refill) in the middle of the night from an ecommerce website (e.g., a pharmacy website) and requests that the item be delivered to his or her house as soon as possible (e.g., via a UAV). In step 1003, the pharmacy receives the request via its ecommerce website and begins to process the request. For example, the pharmacy may automatically or manually prepare the requested prescription, package said item, and ensure that a UAV is available (e.g., loaded on a launching dock at a warehouse associated with the pharmacy).

In step 1005, a UAV loaded on a launching dock at the warehouse can determine the receipt of the user's request via the pharmacy and/or the pharmacy's ecommerce website, "wake" itself from a sleep mode (if applicable), and notify the pharmacy of its availability (e.g., its batteries being fully charged). In step 1007, the UAV determines whether the delivery address is a known address (e.g., stored in an accessible database). For example, the database may include address/postal code and delivery path pairs (e.g., 1115 W 19th Place Chicago USA 60608=delivery path P5; 1933 W Polk St. Chicago USA 60612=delivery path P25, etc.). In one embodiment, once the UAV determines that the delivery address is a known address, the UAV can retrieve the corresponding delivery path from the address and delivery path pairs database. For example, if the UAV determines that the package is to be delivered to 1115 W 19th Place (a known address), the UAV can then access the database and determine that the corresponding delivery path is P5. In one embodiment, the geometry of the delivery path P5 and the sky route to the delivery path P5 can be determined by the UAV from another database. Alternatively, if the delivery address is unknown to the UAV, the UAV must first determine a delivery path (e.g., by requesting the delivery path from the system 100). In one embodiment, where the delivery address is already known to the UAV, in step 1009, the UAV determines whether the purchased item has been attached and secured for delivery. If not, the UAV notifies the pharmacy, for example, in step 1011. Once the UAV determines that the requested item is secured, the UAV accesses the relevant delivery path data object in step 1013 (e.g., from the address and delivery path pairs database) and begins the delivery process.

In this example, the UAV determines in step 1007 that the delivery address is unknown and, therefore, in step 1015, the UAV requests that the system 100 determine a delivery path to a delivery surface at the user's house (e.g., a doorstep). In one embodiment, the system 100 can determine the at least one delivery path based, at least in part, on 2D data (e.g., aerial image data), 3D data (e.g., LIDAR data), or a combination thereof associated with the delivery surface, one or more geographic areas proximate to the delivery surface, or a combination thereof. In step 1017, the system 100 constructs a delivery path data object for the UAV to access based on the UAV's request in step 1015. By way of example, the delivery path data object represents the variable width path the UAV should fly in order to safely access the delivery surface (e.g., the doorstep) from the open sky without damaging the UAV or the package or violating any government regulations. In step 1019, the UAV determines the availability of the requested delivery path data object (e.g., based on a prompt or notification sent by the system 100) and begins accessing the delivery path data object (e.g., downloading the relevant code).

In step 1021, the UAV determines whether the delivery path data object was downloaded correctly (i.e., was not initially corrupted and/or corrupted during the download process). If not, the UAV can attempt to repeat the download sequence in step 1023 and/or request a new delivery path data object from the system 100. Once the UAV confirms that the delivery path data object has been successfully accessed, in step 1025 (similar to step 1009), the UAV determines whether the package containing the purchase item has been attached and secured for delivery. If not, the UAV notifies the pharmacy, for example, in step 1027. Once the UAV determines that the package has been attached and secured, in step 1029 (similar to step 1013), the UAV begins accessing the delivery path data object and starts its travel from the warehouse to the delivery surface (e.g., the doorstep) following the delivery path determined by the system 100. In step 1031, the UAV can determine whether it has reached the delivery surface (e.g., determining that it has reached the end of the 3D NURB spline). If not, the UAV continues along the delivery path. In step 1033, once the UAV determines that it has, in fact, reached the delivery surface, the UAV delivers the requested item (e.g., by releasing the package). Thereafter, in step 1035, the UAV follows the delivery path in reverse order back to the warehouse.

In one embodiment, during the delivery path data object access step (e.g., step 1013 or step 1027), the UAV may "lock" on to a particular delivery path. In one embodiment, once a UAV is locked onto a particular delivery path (e.g., P5), a delivery path database, for example, may be updated and then no other UAVs can access the same delivery path at the same time. For example, similar to a semaphore, each UAV can check and then change its status (e.g., in a delivery path database) with respect to a particular delivery path (e.g., in route, in queue, etc.). Depending on the delivery path status value that the UAV determines (e.g., from a delivery path database), the UAV can use the delivery path or will determine it is already in use (e.g., by another UAV) and, therefore, must wait for some period of time before attempting to access the same delivery path again.

In one embodiment, the UAV may determine contextual information such as wind and weather conditions in route that may affect the UAV's ability to follow the delivery path (e.g., using one or more onboard sensors) and then relay this information in substantially real-time to the system 100. In one embodiment, the UAV may request one or more modifications of the delivery path based, at least in part, on the determination of the contextual information. In one embodiment, the system 100 may automatically modify the delivery path data object based, at least in part, on receipt of the contextual information from the UAV or another source and then transmit the new delivery path data object to the UAV. In one embodiment, the UAV can determine or access the new delivery path data object and/or determine or access just the relevant portions and adjust its delivery path accordingly. For example, in windy conditions, the system 100 may condense the width of the UAV's flight path to better ensure that the UAV will avoid tree branches or structures proximate to the delivery surface.

The processes described herein for constructing a delivery path that enables a UAV to safely access a delivery surface from the open sky may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to construct a delivery path that enables a UAV to safely access a delivery surface from the open sky as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of constructing a delivery path that enables a UAV to safely access a delivery surface from the open sky.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to construct a delivery path that enables a UAV to safely access a delivery surface from the open sky. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for constructing a delivery path that enables a UAV to safely access a delivery surface from the open sky. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for constructing a delivery path that enables a UAV to safely access a delivery surface from the open sky, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for constructing a delivery path that enables a UAV to safely access a delivery surface from the open sky to the UEs 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
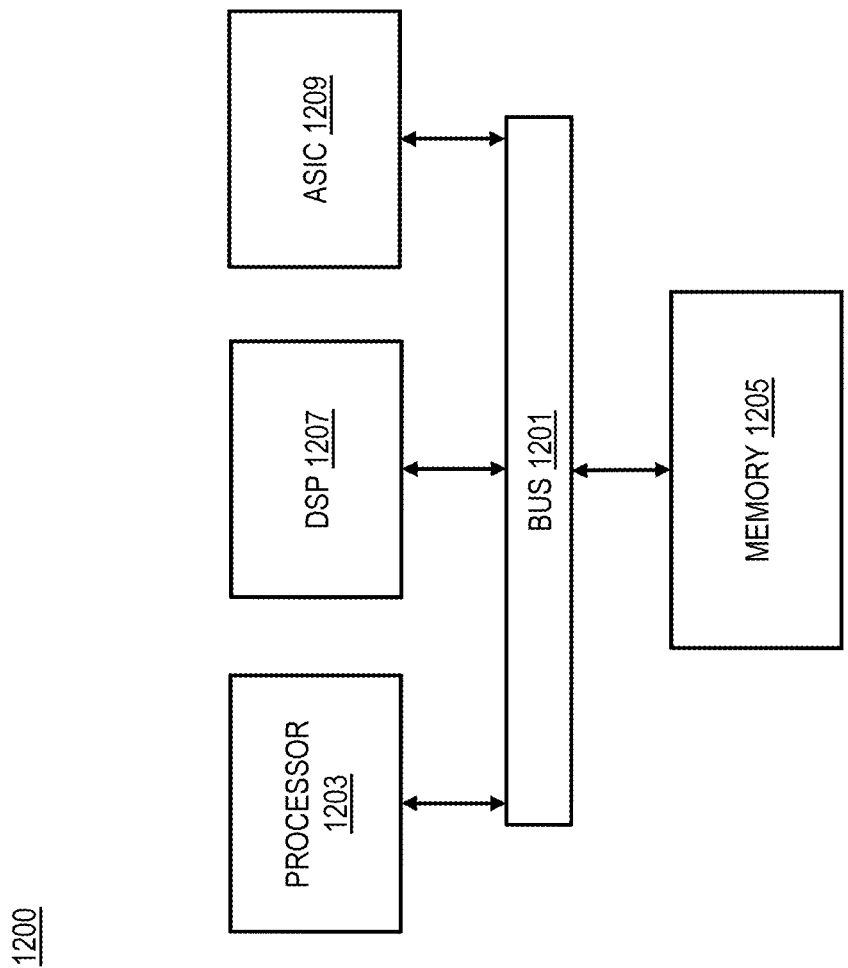
FIG. 12 is a diagram of a chip set that can be used to implement an embodiment of the invention.

FIG. 12 illustrates a chip set or chip 1200 upon which an embodiment of the invention may be implemented. Chip set 1200 is programmed to construct a delivery path that enables a UAV to safely access a delivery surface from the open sky as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of constructing a delivery path that enables a UAV to safely access a delivery surface from the open sky.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to construct a delivery path that enables a UAV to safely access a delivery surface from the open sky. The memory 1205 also stores the data associated with or generated by the execution of the inventive steps.

Figure 13:
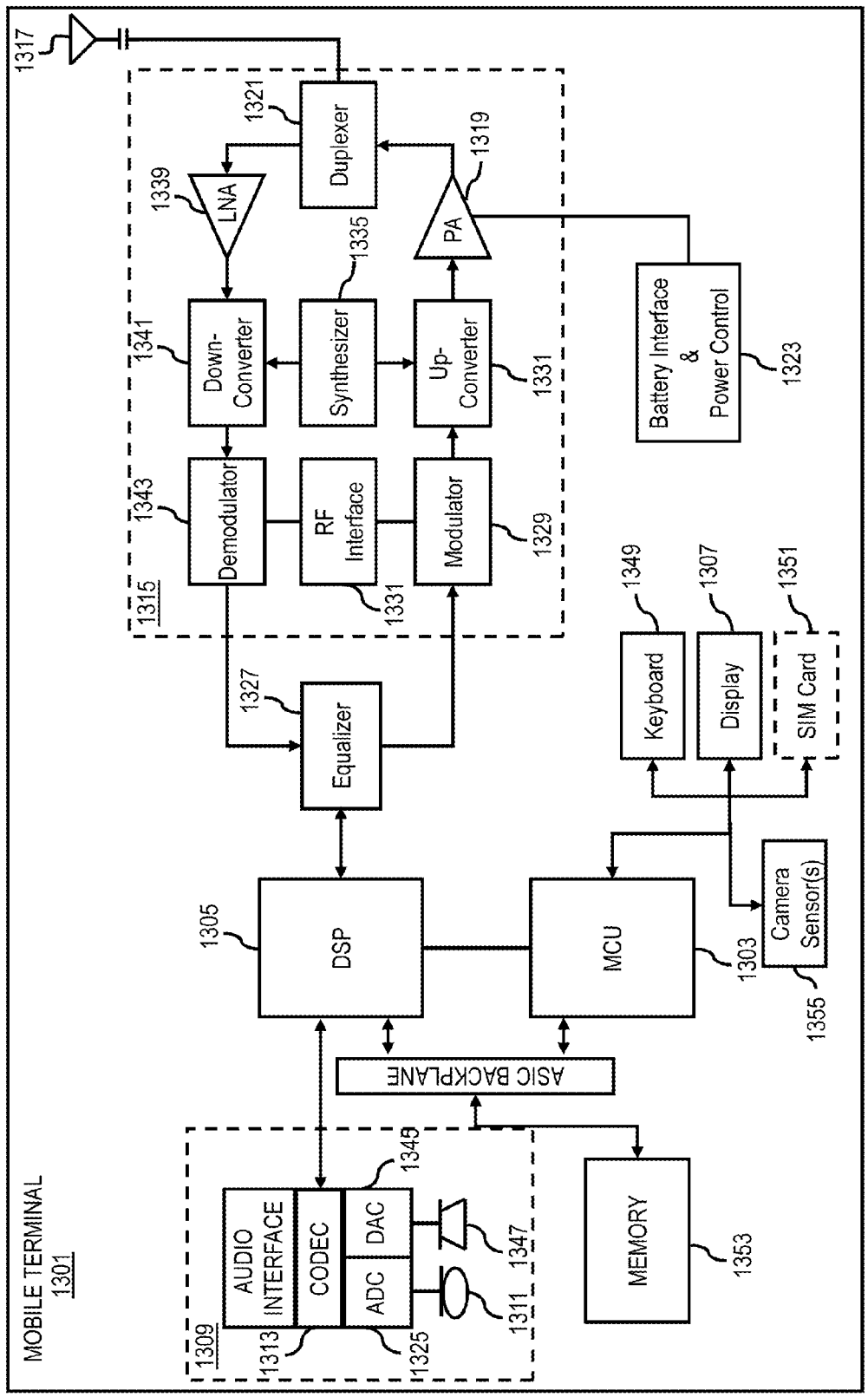
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of constructing a delivery path that enables a UAV to safely access a delivery surface from the open sky. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of constructing a delivery path that enables a UAV to safely access a delivery surface from the open sky. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to construct a delivery path that enables a UAV to safely access a delivery surface from the open sky. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining at least one delivery path to at least one delivery surface, wherein the at least one delivery path represents at least one three-dimensional variable width path along which at least one aerial delivery vehicle can access the at least one delivery surface;
   transecting the at least one delivery path with one or more planar surfaces at one or more distance intervals on the at least one delivery path;
   determining one or more shapes on the one or more planar surfaces, wherein the one or more shapes represent one or more intersections of the at least one delivery path and the one or more planar surfaces; and
   constructing at least one delivery path data object comprising at least one ordered list of the one or more shapes to represent the at least one delivery path.

2. A method of claim 1, further comprising:
   determining one or more parameters for describing the one or more shapes; and
   encoding the one or more parameters in the at least one delivery path data object.

3. A method of claim 2, wherein the one or more parameters include, at least in part, one or more geometric points describing position information of the one or more intersections with respect to the one or more planar surfaces.

4. A method of claim 3, further comprising:
   determining the one or more geometric points based, at least in part, on at least one centroid of the one or more shapes, the at least one delivery path, or a combination thereof.

5. A method of claim 1, further comprising:
   determining the at least one delivery path based, at least in part, on one or more obstructions, one or more restricted paths, or a combination thereof associated with the at least one delivery surface, one or more geographic areas proximate to the at least one delivery surface, or a combination thereof.

6. A method of claim 1, wherein the one or more planar surfaces transect the at least one delivery path horizontally, vertically, or a combination thereof further comprising:
   determining the one or more distance intervals so that the one or more distance intervals span a first distance associated with the at least one delivery surface to a second distance associated with at least one open area.

7. A method of claim 1, further comprising:
   determining the at least one delivery path based, at least in part, on two-dimensional data, three-dimensional data, or a combination thereof associated with the at least one delivery surface, one or more geographic areas proximate to the at least one delivery surface, or a combination thereof,
   wherein the two-dimensional data include, at least in part, aerial image data, and the three-dimensional data include, at least in part, Light Detection and Ranging (LIDAR) data.

8. A method of claim 7, wherein the two-dimensional data, the three-dimensional data, or a combination thereof are collected by at least one street-level sensor, at least one aerial sensor, or a combination thereof.

9. A method of claim 7, further comprising:
   validating the at least one delivery path data object using the two-dimensional data, the three-dimensional data, other two-dimensional data, other three-dimensional data, or a combination thereof associated with the at least one delivery surface, one or more geographic areas proximate to the at least one delivery surface, or a combination thereof.

10. A method of claim 1, further comprising:
determining at least one common section between the at least one delivery path and at least one other delivery path;
determining at least one portion of at least one other delivery path data object representing the at least one other delivery path; and
sharing the at least one portion between the at least one delivery path data object and the at least one other delivery path data object.

11. An apparatus comprising:
at least one processor; and
at least one memory including computer program code for one or more programs,
the at least one memory and the computer program code configured to, with the at least one processor, cause the apparatus to perform at least the following:
determine at least one delivery path to at least one delivery surface, wherein the at least one delivery path represents at least one three-dimensional variable width path along which at least one aerial delivery vehicle can access the at least one delivery surface;
transect the at least one delivery path with one or more planar surfaces at one or more distance intervals on the at least one delivery path;
determine one or more shapes on the one or more planar surfaces, wherein the one or more shapes represent one or more intersections of the at least one delivery path and the one or more planar surfaces; and
construct at least one delivery path data object comprising at least one ordered list of the one or more shapes to represent the at least one delivery path.

12. An apparatus of claim 11, wherein the apparatus is further caused to:
determine one or more parameters for describing the one or more shapes; and
encode the one or more parameters in the at least one delivery path data object.

13. An apparatus of claim 12, wherein the one or more parameters include, at least in part, one or more geometric points describing position information of the one or more intersections with respect to the one or more planar surfaces.

14. An apparatus of claim 13, wherein the apparatus is further caused to:
determine the one or more geometric points based, at least in part, on at least one centroid of the one or more shapes, the at least one delivery path, or a combination thereof.

15. An apparatus of claim 11, wherein the apparatus is further caused to:
determine the at least one delivery path based, at least in part, on one or more obstructions, one or more restricted paths, or a combination thereof associated with the at least one delivery surface, one or more geographic areas proximate to the at least one delivery surface, or a combination thereof.

16. An apparatus of claim 11, wherein the one or more planar surfaces transect the at least one delivery path horizontally, vertically, or a combination thereof the apparatus is further caused to:
determine the one or more distance intervals so that the one or more distance intervals span a first distance associated with the at least one delivery surface to a second distance associated with at least one open area.

17. An apparatus of claim 11, wherein the apparatus is further caused to:
determine the at least one delivery path based, at least in part, on two-dimensional data, three-dimensional data, or a combination thereof associated with the at least one delivery surface, one or more geographic areas proximate to the at least one delivery surface, or a combination thereof,
wherein the two-dimensional data include, at least in part, aerial image data, and the three-dimensional data include, at least in part, Light Detection and Ranging (LIDAR) data.

18. An apparatus of claim 17, wherein the two-dimensional data, the three-dimensional data, or a combination thereof are collected by at least one street-level sensor, at least one aerial sensor, or a combination thereof.

19. An apparatus of claim 17, wherein the apparatus is further caused to:
validating the at least one delivery path data object using the two-dimensional data, the three-dimensional data, other two-dimensional data, other three-dimensional data, or a combination thereof associated with the at least one delivery surface, one or more geographic areas proximate to the at least one delivery surface, or a combination thereof.

20. An apparatus of claim 11, wherein the apparatus is further caused to:
determine at least one common section between the at least one delivery path and at least one other delivery path;
determine at least one portion of at least one other delivery path data object representing the at least one other delivery path; and
share the at least one portion between the at least one delivery path data object and the at least one other delivery path data object.

* * * * *